United States Patent
Layton et al.

[11] Patent Number: 5,132,336
[45] Date of Patent: Jul. 21, 1992

[54] PLASTIC OVENWARE COMPOSITIONS

[75] Inventors: Richard Layton, Augusta, Ga.; Paul J. Huspeni, North Augusta, S.C.; Paul D. Frayer, Martinez, Ga.

[73] Assignee: Amoco Corporation, Chicago, Ill.

[21] Appl. No.: 697,809

[22] Filed: May 9, 1991

Related U.S. Application Data

[63] Continuation of Ser. No. 464,250, Jan. 12, 1990, abandoned.

[51] Int. Cl.$^5$ .................. C08K 3/34; C08K 3/10; C08L 67/03
[52] U.S. Cl. .................. 523/100; 524/451; 524/539; 525/444
[58] Field of Search .............. 523/100; 524/451, 539; 525/444

[56] References Cited

U.S. PATENT DOCUMENTS

| | | | |
|---|---|---|---|
| 3,637,595 | 5/1969 | Cottis | 528/179 |
| 4,563,508 | 1/1986 | Cottis | 524/451 |
| 4,626,557 | 12/1986 | Duska | 523/100 |

Primary Examiner—James J. Seidleck
Assistant Examiner—David Buttner
Attorney, Agent, or Firm—Matthew R. Hooper; William H. Magidson; Robert J. Wagner

[57] ABSTRACT

A molded article of permanent ovenware comprising (A) 35-85% by weight of a wholly aromatic polyester resin; (B) 15-65% by weight of a specifically defined talc containing a minimum amount of materials decomposable at elevated temperatures; and (C) 0-20% titanium dioxide, wherein the wholly aromatic polyester resin (A) is a blend comprising a first resin based on repeating units of hydroquinone, isophthalic acid (or mixtures of iso- and terephthalic acids), and para-hydroxybenzoic acid, and a second resin based on repeating units of biphenol, isophthalic acid, terephthalic acid and para-hydroxybenzoic acid. The ovenware shows excellent resistance to blistering, bubbling and cracking during molding and oven use.

7 Claims, 2 Drawing Sheets

PLASTIC OVENWARE COMPOSITIONS

This is a continuation of application Ser. No. 464,250, filed Jan. 12, 1990 now abandoned.

FIELD OF THE INVENTION

Novel plastic compositions which can be fabricated into permanent ovenware capable of repeated use in both conventional thermal and microwave ovens are described. These compositions are comprised of a wholly aromatic polyester resin and of up to about 60 percent by weight of talc. The wholly aromatic polyester resin is a blend comprised of:

(a) 1–19 parts by weight of a first polyester consisting essentially of units (I), (II), (III), and (IV):

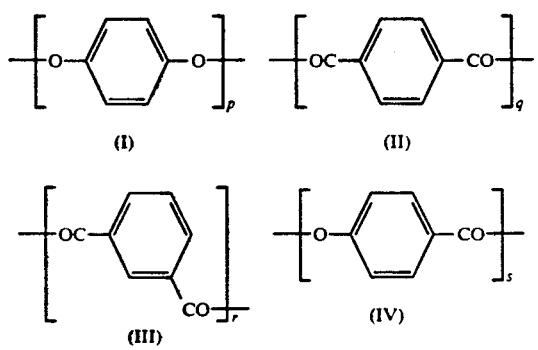

where p is approximately equal to $q+r$; q is in the range of from 0 to about 0.76; r is in the range of from 1.00 to about 0.24; s is in the range of from about 0.18 to about 9.0; and where said first polyester has a melting point of from about 300° to about 420° C.; and (b) one part by weight of a second polyester consisting essentially of units (V), (VI), (VII), and (VIII):

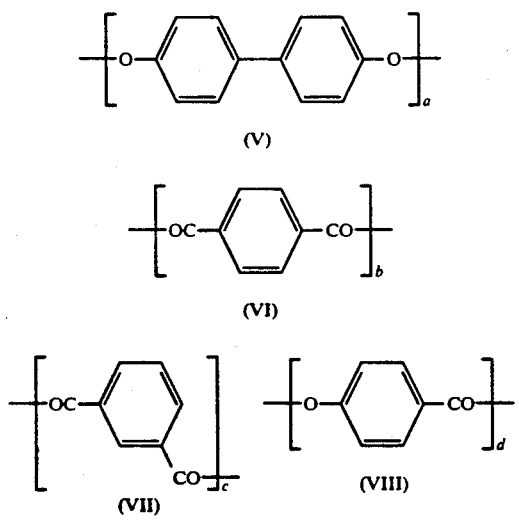

where a is approximately equal to $b+c$; b is in the range of from about 0.5 to about 0.8; c is in the range of from about 0.05 to about 0.2; and d is in the range of from about 1 to about 7; preferably from about 2 to about 4; the molecular weights of said polyesters (a) and (b) being in the range of from about 2,000 to about 200,000.

The talcs useful for the purpose of the instant invention are characterized by a low weight loss on ignition, a low iron content analyzed as iron oxide, and a closely controlled particle size.

The instant compositions display a combination of excellent mechanical, thermal and electrical properties; ovenware fabricated from these materials meets the stringent demands of the cook-in container market.

BACKGROUND OF THE INVENTION

It is known that certain plastic materials have found application in the ovenware field. For example, polymethylpentene has been used for injection molded trays which can be used in the preparation of foods. The poly-(aryl ether sulfone) from 2,2-bis(4-hydroxyphenyl)propane ("Bisphenol-A") and 4,4'-dichlorodiphenyl sulfone (UDEL Polysulfone, sold by Amoco Performance Products, Inc.) is also employed in food handling applications. Although UDEL Polysulfone, for example, gives excellent results in a number of applications; the ultimate polymer composition for this type of application must possess utility over the wide ranges of conditions and of demands which are encountered in the provision of cook-in containers; and must yield ovenware which can be used in either thermal ovens or microwave ovens.

In addition to the obvious necessity for a material which can withstand the temperatures met in the heat source used for cooking, a material must provide a unique combination of a number of characteristics before ovenware fabricated from it can be successfully employed in the preparation of food. The composition must have good microwave properties. It must be able to undergo severe thermal shocks; ovenware prepared from it must be capable of going from conditions of extreme cold to high temperatures in relatively brief periods of time. The material must have good hardness, impact and drop strength and possess high tensile and flexural strength. It must also be resistant to boiling water, food acids and fats, and to adverse effects from immersion in detergents under dishwasher cycles.

In the area of food related properties the material must impart to the ovenware fabricated from it, resistance to staining by a wide variety of foodstuffs. It must provide a surface affording good antistick properties, ready releasability for the food which it contains. It must not emit or give off any volatile matter, and it must not have any extractable constituent. And, in addition to meeting all of the foregoing requirements, articles prepared from it must present a pleasing and generally uniform appearance in order to be marketable.

Plastic compositions with an overall good combination of properties, yielding satisfactory ovenware articles and based on p-oxybenzoyl polyesters are described in Duska, et al., U.S. Pat. No. 4,626,557.

Recent work in these laboratories resulted in the preparation of a host of novel inexpensive hydroquinone poly(iso-terephthalates) containing p-hydroxybenzoic acid moieties. The molar ratios of a group of these materials is shown on the attached triangular diagram FIG. I and is described in the Definition of the Invention. The polymers melt in the range of from about 300° to about 420° C. Of particular interest are the polyesters falling into the two areas A and B of FIG. I. The latter products were found to form a stable oriented melt phase at 340° to 400° C.; the melt phase is tractable and can be extruded below its decomposition temperature to form high modulus and high strength fibers, films and molded articles displaying a good retention of properties at high temperatures. Materials filled with 30 weight percent of glass fibers have heat distortion temperatures of from about 240° to about 280° C., under a load of 264 psi. Moreover, the polymers grouped in areas A and B have crystallization temperatures in the range of from 300° to 340° C.; and their crystallization rates are at least 1000 counts per minute and up to 3500 counts per minute as measured by X-ray techniques. The polyesters are the subject of commonly assigned U.S. patent application entitled "Hydroquinone Poly(iso-terephthalates) Containing Residues of p-Hydroxybenzoic Acid", Ser. No. 412,785, filed concurrently with the present application, now U.S. Pat. No. 5,097,001.

Our investigations have also shown that alloys having markedly improved molded properties are obtained when the copolyesters hereinabove described are blended with wholly aromatic polyesters comprising units (V), (VI), (VII), and (VIII) in well-defined proportions. In view of the fact that alloys of materials having ordered structures are expected to show reduced properties, the discovery was highly surprising and totally unexpected. Improved characteristics included improved blister resistance, which is poorly understood and not predictable. The novel alloys are the subject of commonly assigned U.S. patent application entitled "Polymer Compositions Having Improved Molding Characteristics", Ser. No. 451,366, filed concurrently with the present application now abandoned.

It was now unexpectedly discovered that the attractive properties of the hydroquinone copolyester-based alloys are maintained in composites comprising talcs of well-defined characteristics. The novel composites meet the stringent requirements of cook-in containers and are suitable for the fabrication of demanding ovenware articles.

THE INVENTION

Ovenware meeting the stringent demands of the cook-in container market is provided by fabricating the ovenware articles from a plastic material which is a blend comprising:

(a) 1–19 parts and preferably about 1.5 to about 9 parts by weight of a first polyester consisting essentially of units (I), (II), (III), and (IV).

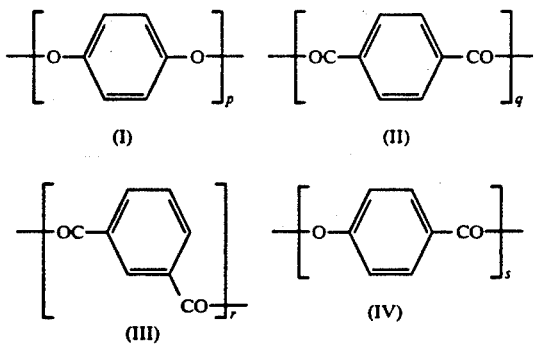

where p is approximately equal to q+r; q is in the range of from 0 to about 0.76; r is in the range of from 1.00 to about 0.24; s is in the range of from about 0.18 to about 9.0; and where said first polyester has a melting point of from about 300° to about 420° C.; and (b) 1 part by weight of a second polyester consisting essentially of units (V), (VI), (VII), and (VIII).

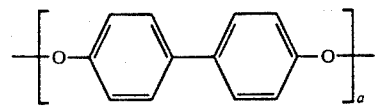

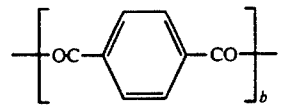

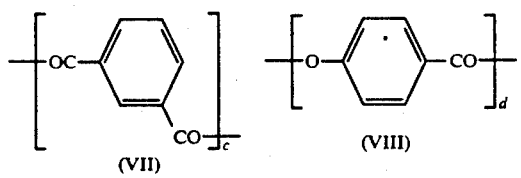

where a is approximately equal to b+c; b is in the range of from about 0.5 to about 0.8; c is in the range of from about 0.5 to about 0.2; and d is in the range of from about 1 to about 7; preferably from about 2 to about 4.

BRIEF DESCRIPTION OF THE FIGURES

The compositions corresponding to the wholly aromatic polyesters (a) and (b) are plotted on the triangular diagrams FIGS. I and II.

The coordinates for each point of these areas define a copolyester in terms of molar percentages of p-oxybenzoyl, diphenol terephthaloyl, diphenol isophthaloyl units, hydroquinone terephthaloyl and hydroquinone isophthalolyl. Parameters p, q, r and s; and a, b, c and d can then be calculated from the above using methods known in the art.

Figure 2:
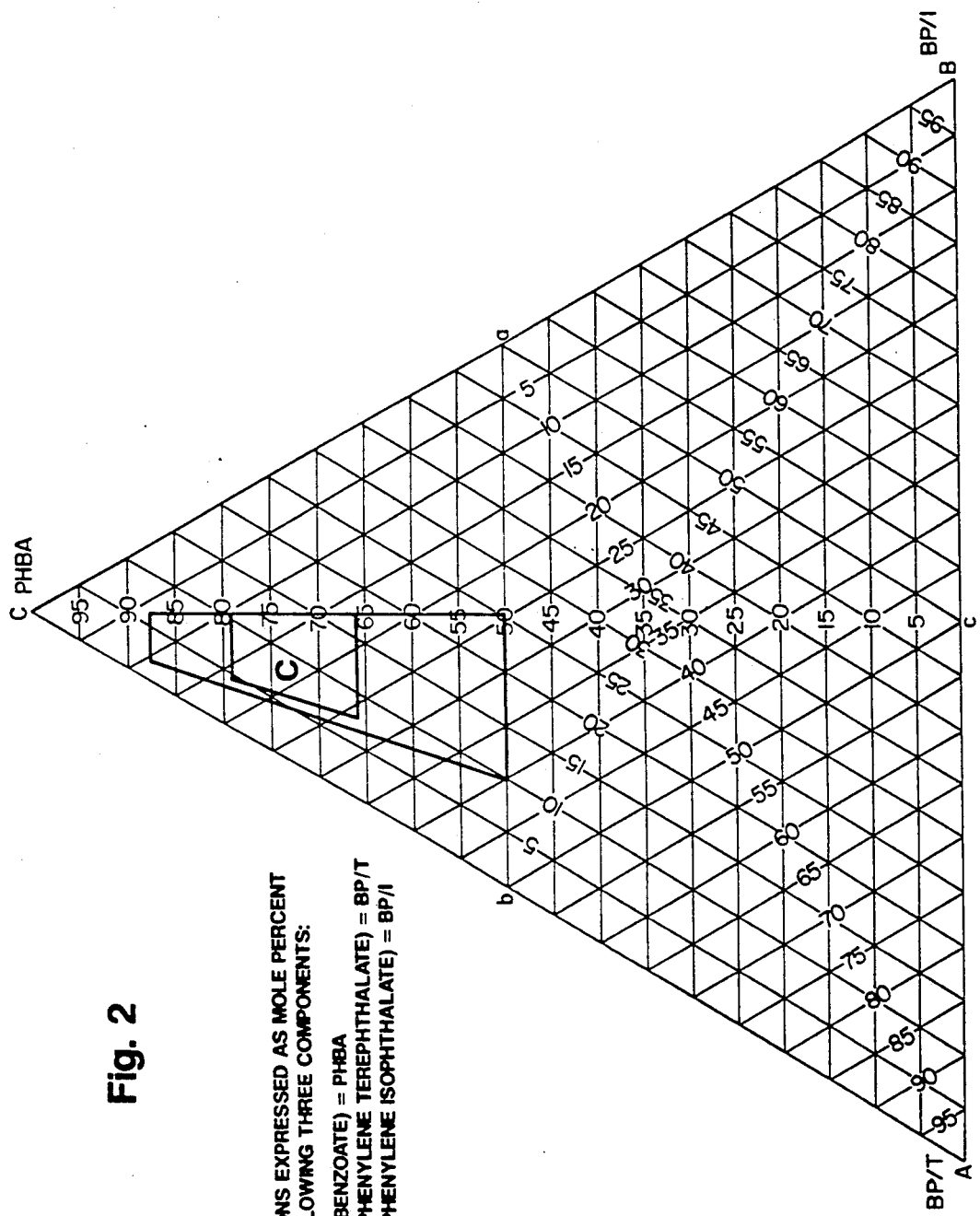

Those materials that are grouped into areas A, B and C are preferred. The polymers of the two areas A and B [FIG. I] are characterized in that (1) they are melt processible below their decomposition temperatures; (2) their melting points are in the range of 340° to 400° C.; (3) their crystallization temperatures are in the range of 300° to 340° C.; (4) their rates of crystallization are at least 1000 counts per minute; and (5) they yield composites having heat distortion temperatures under a load of 264 psi of about 240° to about 280° C.; when filled with 30 percent by weight of glass fibers. Materials corresponding to area C [FIG. 2] have been defined above as polyester (b).

The two polyesters, (a) and (b), have molecular weights in the range of about 2,000 to about 200,000; preferably about 10,000 to about 50,000 and most preferably about 20,000 to about 25,000.

The synthesis of the polyesters of the instant invention is described in detail in Cottis, et al., U.S. Pat. No. 3,637,595 entitled "P-Oxybenzoyl Copolyesters"; and in Finestone, U.S. Pat. No. 4,742,149 entitled "Production of Melt-Consistent Aromatic Polyesters", the disclosure of the aforementioned two patents is incorporated herein by reference.

The bulk condensation of aromatic polyesters is described in the patient literature and broadly considered, involves an alkanoylation step in which a suitable dicarboxylic acid, hydroxybenzoic acid and diol are reacted with an acid anhydride; a prepolymerization step in which the reaction product of the first step is polycondensed to prepare a prepolymer; and the prepolymer is thereafter heated in a third step to produce a polycondensate of the desired degree of polymerization.

Thus, in somewhat greater detail, the instant copolyesters are prepared by charging into the reactor the required amounts of isophthalic and terephthalic acids, p-hydroxybenzoic acid, and hydroquinone or 4,4'-biphenol. An anhydride of a lower, preferably a $C_2$ to $C_4$, aliphatic monocarboxylic acid, is added in at least stoichiometric amounts. It is most preferred to use acetic anhydride; its amount is preferably from about 5 to about 20 mole percent over that required for the acetylation of all of the hydroxyl groups. The acetylation reaction takes place at about 140° C. for a period of time of from about 2 to about 6 hours. The reaction mixture is then heated to about 240°-320° C. at a rate of about 20° to about 40° C. per hours, and is kept at about 240° to about 320° C. for approximately a few minutes to 4 additional hours. The obtained low molecular weight polymer is then solid state advanced to the required high molecular weight by heating to a temperature of about 10° to about 90° C. below the melting point of the wholly aromatic polyester, for a period of time of from about 1 to about 24 hours.

A preferred variant, as described in Finestone, U.S. Pat. No. 4,742,149, comprises adding a salt, particularly an alkaline earth metal salt or an alkali metal salt, preferably potassium sulfate, during the preparation of the resin, and, particularly to the prepolymer melt prior to advancement of the final product to the desired degree of polymerization. The incorporation of stabilizing amounts of phosphites, as described in Cottis, U.S. Pat. No. 4,639,504, is also advantageous.

The polyesters useful in the present invention can be employed with various fillers of types and in amounts which either promote or at a minimum do not materially affect the desired properties. Examples of suitable fillers include among other glass fibers, milled glass, polytetrafluoroethylene, pigments and fillers and combinations thereof.

While the ovenware prepared from compositions comprising the polyesters and the various fillers recited above meet most of the general requirements recited earlier, they do not have the uniform, pleasing appearance necessary to a commercially marketable product. In addition, it has been observed that many of the fillers create excess bubbling in the ovenware products at elevated temperatures.

It has been found in accordance with the present invention that a uniform and pleasing appearance can be imparted to the ovenware articles and the undesirable bubbling suppressed or minimized by the inclusion in the oxybenzoyl compositions from which they are molded of talc which contains a minimum amount of materials decomposable at elevated temperatures, e.g., up to about 800° C., such as magnesium carbonate. Among such talcs are talcs which are of high purity, are selectively combined from various ores or have been calcined or subjected to acid treatment.

These talcs which are employed according to the present invention are characterized by a low weight loss on ignition, a low iron content analyzed as iron oxide and a closely controlled particle size.

The weight loss on ignition of the suitable talcs is not more than 6 percent or less at 950° C. and is 2 percent or less at 800° C. The iron content analyzed as iron oxide ($Fe_2O_3$) will not be more than about 1 percent and that of the particularly preferred talcs will be not more than about 0.6 percent and may be less. In addition, the particle size distribution of the talc must preferably be such that about 90 to 95 percent of the particles are less than about 40 microns.

Experiments and tests carried out have demonstrated quite conclusively that it is essential to use such talc in order to realize the objectives of the present invention. The use of other forms of talc does not provide satisfactory properties in the finished molded product. However, such other forms of talc can be employed in conjunction with the specified talcs in amounts of from about 0.05 percent to about 20 percent of the required forms of talc.

The talcs containing the minimum amounts of decomposable material will be presented in amounts of from about 1 percent to about 60 percent based on the total composition weight with the preferred range being from about 35 percent to about 55 percent.

Rutile titanium dioxide can also be employed in conjunction with the talc material, including mixtures of highly refined talcs and other talc. The rutile titanium dioxide will be present in a proportion of from about 2 percent to about 20 percent based on the weight of the total composition. The preferred range is from about 5 percent to about 15 percent.

In the molding compositions of the present invention, the resin will generally comprise from about 35 percent to about 85 percent and the total inerts from about 65 percent to about 15 percent. For optimum results, the inerts will comprise from about 40 percent to about 55 percent of the molding compositions. The inerts will comprise up to about 55 percent of highly refined talc and from about 0 to about 10 percent of titanium dioxide.

The compositions of the present invention can be prepared by extrusion in accordance with generally known practice. For example, a twin screw extruder can be employed with addition of the polymer, selected talc and titanium dioxide at the feed throat and with addition of the glass roving at both the vent and feed throat.

The compositions so prepared can then be injection molded according to general practice using techniques familiar to the injection molding field.

EXAMPLES

The following examples serve to give specific illustrations of the practice of this invention but they are not intended in any way to limit the scope of this invention.

A. Experimental Procedures

The following procedures were used to obtain the data given in the examples.

A.1. Compressive Flow (CF)

The term Compressive Flow (CF) as used in this application is a measure of the flow of a weighed sample when pressed on a Carver press at 5000 pounds. It is also an indirect measure of the polymer molecular weight; the higher the CF value at a given temperature, the lower is the molecular weight of the wholly aromatic polyester.

CF is measured from the area of a disc obtained from a sample of powdered material of given weight, usually 0.5 to 1.0 grams which has been pressed between two parallel plates. In carrying out the determination of this characteristic, a sample is pressed between two sheets of aluminum foil which in turn are backed by chromium plated steel plates 6"×6"×¼". A Carver 2112-X Model No. 150-C hydraulic press modified for 800° F. is used to press the sample. The particular temperature of the press is that indicated in each sample run. The sample material is allowed to stand for five minutes between the plates at holding pressure in order that the temperature of the material can equilibrate with the press temperature. A load of 5000 pounds is then applied for two minutes. The CF is then calculated on the following basis. The area of the pressed molding compound is measured by cutting an aluminum sandwich out of the sample pressed between the aluminum foil sheets. The aluminum foil has a known area/weight relationship called the foil factor. The area is normalized for the pressure of the applied load and that number is multiplied by 100 to give a number greater than 1. The compressive flow is then calculated by means of the following equation:

$$CF = \left[ \frac{\frac{\text{Wt. of circle (sandwich)} - \text{wt. of sample}}{\text{Foil wt. factor}} \times 50}{\text{Applied Load (Kg)} \times \text{wt. of sample}} \right]^2 \times 100$$

A.2. X-ray Measurements (a) Apparatus

X-ray diffraction data were obtained using a Phillips XRG-3000 X-ray generator equipped with a vertical diffractometer, a long, fine focus copper X-ray tube, a Paar HTK-10 high temperature diffractometer attachment and a Paar HTK-Heat Controller. Diffractometer position is controlled by computer, which also measures and records radiation count rate produced by sample crystallinity and sample temperature.

b) Determination of the Polymer Melting Point

A sample of the polymer is submitted to a preliminary X-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Angstroms d-spacing) reaches its minimum value, i.e., an approximate melting point. A second-degree polynomial equation is derived from the above data; this polynomial equation now allows to follow the peak angle as the sample temperature is varied. The temperature at which the peak height reaches a minimum (i.e., touches the baseline) is considered to be the melting point. The polymer sample is now heated and cooled at a rate of 100° C. per minute between the previously-mentioned temperature limits, and its melting point is determined. Since the melting point of a crystalline material often changes on heating and cooling (due to recrystallization, further polymerization, etc.) the sample is cooled and reheated. This allows determination of the melting point on the second heating cycle. Generally, the second cycle yields a melting point which remains approximately constant if additional heating or cooling cycles are performed. Therefore, the value obtained in the second heating cycle is taken as the polymer melting point.

c) Crystallization Temperature

Onset of Crystallization

The onset of crystallization is measure in the same manner except that the scanning (for details, see above), is performed while the sample is cooled at 100° C. per minute. The temperature at which the peak emerges from the baseline during the second cooling cycle is considered as the onset of crystallization.

d) Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chose. Rates of crystallization are expressed as the increase in counts per minute for a sample cooled within these temperature limits during the second cooling cycle.

A.3 Blister Rating

Samples to be tested are preconditioned at 20°-25° C., 50±5 percent relative humidity, for 24 hours. Test sample lot normally includes 5 tensile bars (⅛" thick), 5 HDT bars (5"×½"×¼" thick) and 5 flex bars (5"×½"×⅛"thick). The samples are carefully inspected and any existing cracks and/or blisters are circled. The samples are then annealed in an oven which has been equilibrated at 232° C. (450° F.), for a period of four hours. They are then removed, cooled and inspected. Rating codes follows:

0—no new blisters;
1—very slight blistering (one or two very small blisters);
2—slight blistering (three to six small blisters);
3—moderate blistering (a few large blisters and/or many small blisters); and
4—heavy blistering (many large or small blisters covering more than half of the specimen surface.

The numerical blister rating is calculated using the equation $$R = \frac{1}{n} \sum_{i=1}^{n} X_i^2$$

where
R=numerical blister rating (0-16)
n=number of samples tested
$X_i$=blister rating of sample i (0-4).

In the above calculation the individual ratings for the entire set of test samples (tensile bars, HDT bars, flex bars) are generally treated as a single population. The ratings vary within the range of 0 (no blistering) to 16 (severe blistering, worst case).

B. Preparative Examples

B.1. Preparation of polyester (a) having the following molar composition: 0.4 Isophthalic Acid/0.6 Terephthalic Acid/0.5 p-Hydroxybenzoic Acid/1.0 Hydroquinone.

The following ingredients were combined in a manner described.

| Item | Ingredient | Amount |
|------|------------|--------|
| A | Terephthalic acid | 5.311 Kg |
| B | Isophthalic acid | 3.541 Kg |
| C | p-Hydroxybenzoic acid | 3.680 Kg |
| D | Hydroquinone | 5.868 Kg |
| E | Acetic Anhydride | 15.645 Kg |
| F | Magnesium acetate tetrahydrate | 0.46 gram |
| G | Triphenyl phosphite | 7.36 gram |

Items A through F were charged with 15-gallon, oil heated vessel equipped with an anchor type stirrer, reflux condenser, after condenser, injection port, and distillate receiver. After purging with nitrogen, the contents were heated with stirring to 141° C. and held under reflux at that temperature for 3 hours. Distillation was then started while increasing the temperature over a 4.8 hour period to 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

The melting point of the polymer (X-ray) was 359° C.; its crystallization temperature was 336° C. with a crystallization rate of 2400.

B.2. Preparation of Polyester (b) having the following Molar Composition: 0.25 Isophthalic Acid/0.75 Terephthalic Acid/3.0 p-Hydroxybenzoic Acid/1.0 4,4'-Biphenol.

A mixture of
184 lbs of terephthalic acid;
62 lbs of isophthalic acid;
612 lbs of low ash p-hydroxybenzoic acid;
275 lbs of 4,4'-biphenol;
868 lbs of acetic anhydride; and
40.1 gms (88.5 ppm) of Magnesium acetate tetrahydrate was placed in a 325 gallon reactor and heated with stirring until distillation started. The reactor was held at this temperature for three hours. Distillation was started, and the temperature increased until 400 lbs of distillate had been collected. The contents were pressured into a 200 gallon reactor and the temperature was increased at a rate of 30° C. per hour until the contents reached 313° C. Then the contents were poured into a mechanical mixer and mixed at 290° to 300° C. for 5 hours. Six batches of polymers were made with compressive flows at 330° C. from 55 to 74, and each polymer had very good color.

C. Cookware Formulations

Polyesters (a) and (b), prepared as described in preparative examples B.1 and B.2, were formulated into the following compositions:

| (X) | (Y) |
|-----|-----|
| 44.79 wt. % of polyester (a), | 40.07 wt. % of polyester (a), |
| 12.21 wt. % of polyester (b), | 10.93 wt. % of polyester (b), |
| 37 wt. % of talc, and | 46 wt. % of talc, and |
| 6 wt. % of TiO₂. | 3 wt. % of TiO₂. |

The talc used was "Supra Talc", a high purity platy cosmetic talc made from Italian ore, free of asbestos impurities; sold by the Cypress Industrial Minerals Company, Englewood, Colo. Its iron content, analyzed as $Fe_2O_3$, was 0.5 percent and it had a particle size distribution in which over 95 percent of the particles were less than 40 microns. The titanium dioxide used was rutile Tioxide R-TC2 from Tioxide America, Inc., Columbia, Md.

The two compositions were compounded and pelletized on a 25 mm diameter Berstroff twin screw extruder. The barrel profile temperature for compounding was:

| | |
|---|---|
| Barrel zone 1 = 320–325° C. | Barrel zone 5 = 380–400° C. |
| Barrel zone 2 = 355–362° C. | Barrel zone 6 = 370–380° C. |
| Barrel zone 3 = 355–376° C. | Barrel zone 7 = 360–370° C. |
| Barrel zone 4 = 365–395° C. | Die = 355–380° C. |

The screw rpm was 170 to 175; the output was 12 to 15 pounds per hour.

The formulations were molded into cookware bowls using a 275 ton Windsor molding machine. Molding conditions were:
 barrel temperature=350°–355° C.;
 nozzle temperature=330°–335° C.;
 mold temperature=250°–254° F.
 injection pressure=1900 psi.
 screw rpm=148
 stock temperature=358°–367° C.
 screw recovery=23–25

The obtained cookware bowls had good color and satisfactory gloss and mottling. Their mechanical and thermal properties met the general ovenware requirements. Exposure to 475° F. for 1.5 hours resulted in a practically insignificant blister rating: 0.94 and 0.88 for the bowls made from (X) and (Y) compositions, respectively.

What is claimed is:
1. A molded article of permanent ovenware, comprising:
(A) 35–85% by weight of wholly aromatic polyester resin;
(B) about 15–65% by weight of a talc containing a minimum amount of materials decomposable at elevated temperatures characterized by a weight loss on ignition of not more than about 6% by weight at 950° C. and 2% by weight at 800° C. and having an iron content of not more than about 1.0% by weight analyzed as iron oxide; and
(C) about 0–20% titanium dioxide, such that the ovenware is not blistered or bubbled or cracked during molding or oven use
said aromatic polyester resin (A) comprising a blend of 1–19 parts by weight of a first polyester consisting of the following recurring units

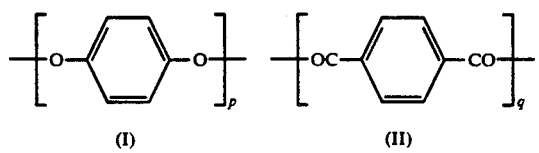

-continued

Figure 1:
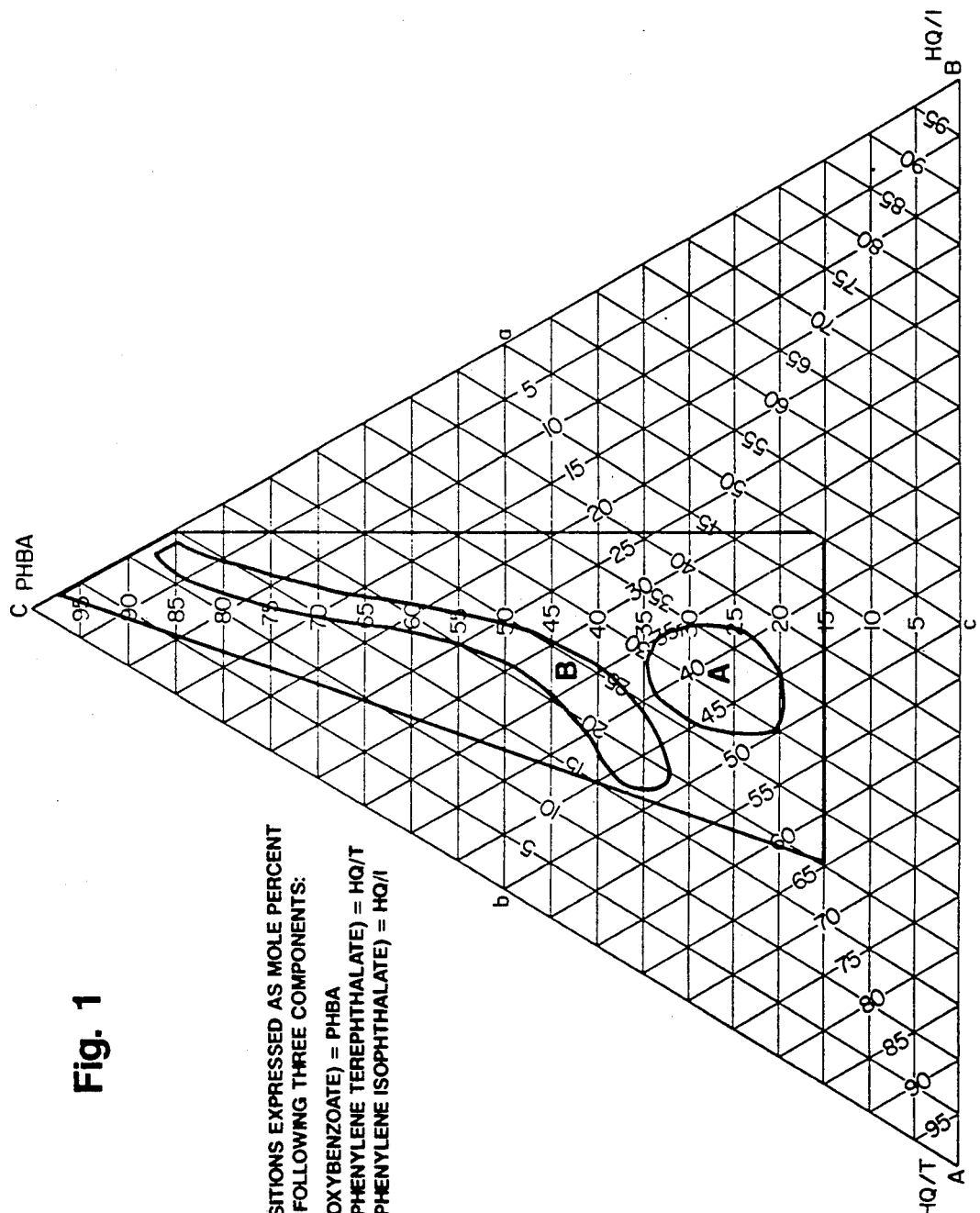

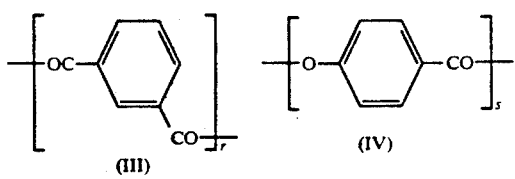

wherein the subscripts p, q, r and s are numbers representing relative molar amounts of units (I), (II), (III) and (IV), respectively, in the polyester; wherein p is approximately equal to q+r; and the values of p, q, r and s are such that said first polyester resin falls within the compositional region selected from the group consisting of areas A and B in the triangular phase diagram of FIG. 1; and said first polyester having a melting point in the range of from about 340° C. to about 400° C., a crystallization temperature of from about 300° C. to about 340° C. and a crystallization rate of at least about 1000 counts per minute; and wherein said first wholly aromatic polyester resin, when filled with 30 wt % glass fibers, has a heat distortion temperature of at least 240° C. when measured under load of 264 psi; to 1 part by weight of a second polyester consisting essentially of the following recurring units:

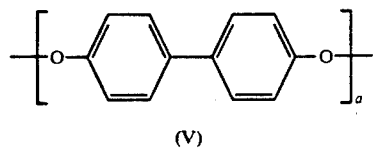

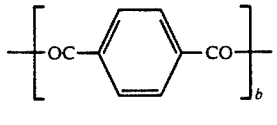

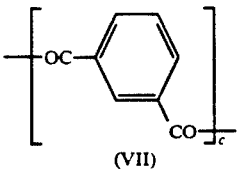 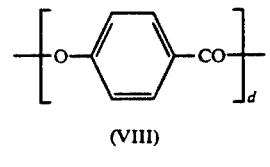

wherein a, b, c and d are numbers representing relative molar amounts of units (V), (VI), (VII) and (VIII), respectively, in the polyester, and where a is approximately equal to b+c; b is in the range of from about 0.5 to about 0.8; c is in the range of from about 0.5 to about 0.2; and d is in the range of from about 1 to about 7.

2. The article of claim 1 wherein the talc is selected from the group consisting of high purity talc, highly refined talc, calcined talc and acid-treated talc.

3. The article of claim 1 comprising about 35 to 55% by weight of said talc.

4. The article of claim 1 wherein said talc comprises a particle size distribution in which at least about 95% of the particles are less than about 40μ.

5. The article of claim 1 comprising about 2 to 20% by weight of titanium dioxide.

6. The article of claim 5 comprising about 5 to 15% by weight of titanium dioxide.

7. The article of claim 1 wherein the weight ratio of said first polyester to said second polyester is approximately 1.5:1 to 9:1.

* * * * *

UNITED STATES PATENT AND TRADEMARK OFFICE
CERTIFICATE OF CORRECTION

PATENT NO. : 5,132,336
DATED : July 21, 1992
INVENTOR(S) : Richard Layton, et al It is certified that error appears in the above-indentified patent and that said Letters Patent is hereby corrected as shown below:

| Col. | Line | |
|---|---|---|
| 4 | 65 | "in the patient" should read --in the patent--. |
| 10 | 59 | "consisting of" should read --consisting essentially of--. |

Signed and Sealed this

Eighth Day of February, 1994

Attest:

BRUCE LEHMAN

Attesting Officer    Commissioner of Patents and Trademarks